United States Patent Office 3,580,924
Patented May 25, 1971

3,580,924
2-DIPHENYLBENZOXAZOLES
Rudolf Anliker, Binningen, Max Duennenberger, Frenkendorf, Karl Schmid, Reinach, Basel-Land, and Adolf Emil Siegrist, Basel, Switzerland, assignors to Ciba Limited, Basel, Switzerland
No Drawing. Filed Dec. 27, 1966, Ser. No. 604,584
Claims priority, application Switzerland, Jan. 7, 1966, 196/66
Int. Cl. C07d 85/48
U.S. Cl. 260—307   4 Claims

ABSTRACT OF THE DISCLOSURE

2-(diphenyl)-benzoxazoles useful as scintillator substances.

The present invention is concerned with the use of selected benzoxazole derivatives for scintillation counting methods in atomic disintegrations.

A number of different derivatives of five-membered nitrogen heterocycles have already been proposed for use in such scintillation counting methods but in general they do not fully satisfy at the same time all demands made on them. Difficulties were encountered especially insofar as the solubility was concerned, though the other conditions to be satisfied by a suitable scintillator substance were approximately met.

It has now been found that certain benzoxazole derivatives from the group of the 2-diphenylylbenzoxazoles, namely those of the formula (1) 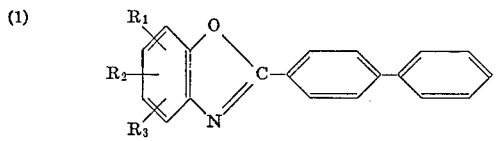

where $R_1$ represents an alkyl group with 3 to 8 carbon atoms or a cycloalkyl group, $R_2$ a hydrogen atom or an alkyl group with 3 to 8 carbon atoms, and $R_3$ a hydrogen atom or an alkyl group with 1 to 4 carbon atoms—are particularly suitable for use as scintillator substances.

It is advantageous to use benzoxazole derivatives of the formula
It is advantageous to use benzoxazole derivatives of the formula (2) 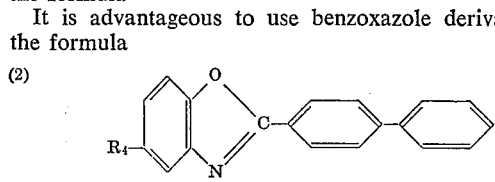

in which $R_4$ represents an alkyl group with 3 to 8 carbon atoms, as scintillator substance for liquid scintillation counting methods.

Within the scope of the Formula 2 those compounds are especially valuable which contain a branched-chain substituent in position 5, that is to say diphenylyl-benzoxazoles of the formula (3) 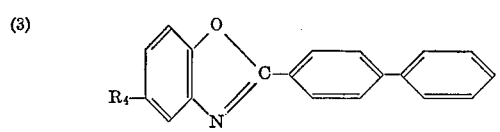

in which $R_4'$ represents a branched-chain alkyl group with 3 to 8 carbon atoms, preferably the tertiary butyl group.

The corresponding scintillation liquids are characterized in that they contain as solvent benzene or an alkyl-benzene liquid at room temperature or a mixture of dioxane+naphthalene+water, and 0.01 to 5% by weight, referred to the weight of the scintillation liquid as a whole, of a diphenylyl-benzoxazole of the Formulae 1, 2 or 3.

As examples of compounds of the indicated type above there may be mentioned the following diphenylyl-benzoxazoles:

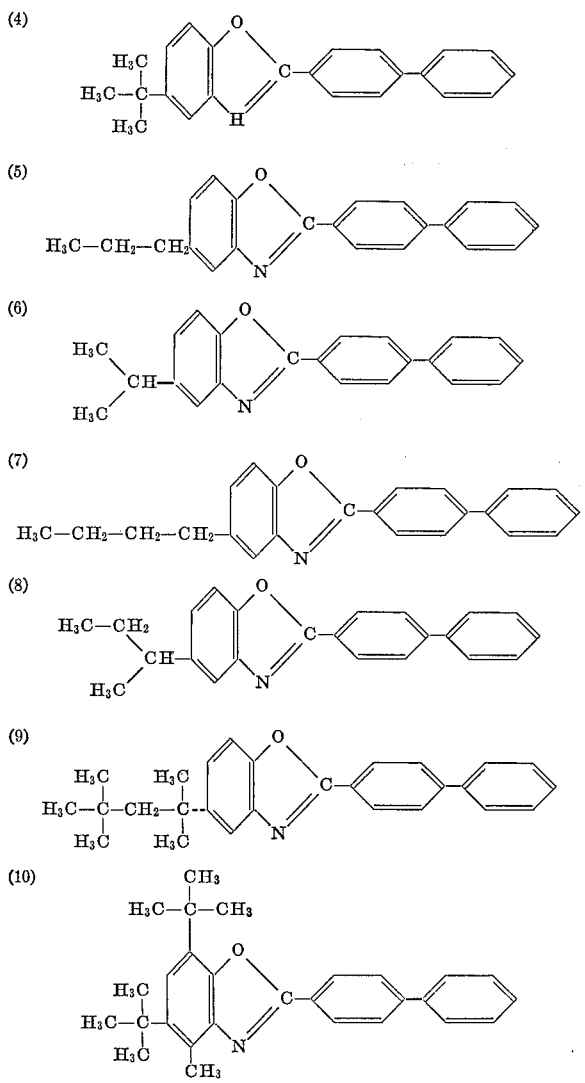

The use of the above-mentioned scintillation substances is of special importance for liquid scintillation counting methods in combination with certain solvent systems. Accordingly, the present invention includes also a method of counting atomic disintegrations accompanied by an emission of β-rays, by means of the liquid scintillation counting method, in predominantly aromatic hydrocarbons as scintillator solvent, wherein the scintillation liquid used is a solution of a benzoxazole derivative of the Formulae 1, 2 or 3 in benzene, in an alkylbenzene liquid at room temperature, or in a mixture of methane+toluene, or methylcellosolve + naphthalene + toluene or dioxane+naphthalene+water.

The specific diphenylyl-benzoxazoles mentioned within the scope of the liquid scintillation counting method referred to above are scintillators in their own right that satisfy all conditions mentioned above. Moreover, they may also be used as so-called primary solutes in the narrow sense, that is to say as a substance primarily caused by an energy-rich radiation of an atomic disintegration to emit light, which are combined with the usual secondary solutes, that is to say substances emitting rays of a longer wavelength. Such suitable secondary solutes are, for example, 1,4-di[2-(5-phenyloxazolyl)]benzene, 1,4-di[2-(4-methyl-5-phenyloxazolyl)]-benzene, 2,5 - di - [5'-tertiary butyl-benzoxazolyl-(2')]-thiophene and 1,4-di-(4'-isopropylstyryl)-benzenes. It is also possible to combine with neutron capture solutes, gamma conversion solutes, further with solvents, gels, suspension auxiliaries or solubilizers. It is, of course, possible to use either internal or external counting methods.

Solvents suitable for the liquid scintillation counting method are above all aromatic hydrocarbons that are liquid at room temperature (when no solvent combination is used) such, for example, as benzene, toluene xylenes, ethylbenzene, 1,3,5-triethylbenzene, cumene, cymenes, phenylcyclohexane, also ethers such as anisol, dioxane, 1,2-dimethoxyethane, nonaromatic hydrocarbons such as cyclohexane, decalin, heptane and the like, or finally solvent mixtures such as toluene+methanol and, if desired, water, toluene+ethanol, napthalene+dioxane, naphthalene+toluene and if desired water, naphthalene+dioxane+water, methylcellosolve+naphthalene+toluene and if desired water, naphthalene+tributylphosphate, or other commercial aromatic hydrocarbon mixtures recommended for this purpose.

The concentration of benzoxazole derivatives to be used in the present invention may in principle vary within wide limits and is determined or limited by practical considerations. In the lower region, for example, it must be selected so that adequate transmission to the photomultiplier is ensured, while the upper region is determined by the setting-in self quenching. Thus, although for instance for the manufacture of stock solutions (which for use are suitably diluted) concentrations of 10% or over are quite possible, the practically acceptable working concentrations are within the range from about 0.1 to 3%, preferably from 0.4 to 2%, of the total weight of the solution.

Preferred solvent systems are, apart from toluene, the systems toluene+methanol (1:1) with an addition of about 2% of water, methylcellosolve+toluene+naphthalene (40:60:8) with up to 4% of water, dioxane+toluene+naphthalene (40:60:8) with up to 10% of water, or toluene+methanol+ethanolamine (50:44:6). The composition of the solvent system depends above all on the nature of the substrate to be measured or on the isotope to be measured. For isotope measuring there are most frequently used $C^{14}$, $H^3$, $S^{35}$, $P^{32}$, $Fe^{59}$, $Fe^{55}$, $I^{125}$ and $I^{131}$.

The technical advance residing in the benzoxazole derivatives to be used in the present invention is more especially the fact that they can be used as scintillators as such (that is without a secondary solute) which not only meet to a high degree all other demands made on them but above all also display excellent solution properties such as were not found in the previously known high-grade scintillators. This is particularly true of their specially good solubility in transparent solvents having a high flashpoint. For example, the compound of the Formula 4 displays a solubility of 144 g./litre in toluene at 1° C.

Over and above the sphere of application described above the compound defined above may be used wherever an energy-rich radiation is to be converted into measurable light.

An important sphere of use is, for example, the utilization for the so-called plastic scintillators; the scintillator may be homogeneously dispersed in the polymeric substance concerned (polymer, polycondensate or polyadduct) before the final shaping operation (casting, drawing, pressing, injection moulding or the like) and then shaped. Alternatively, the scintillator may be added to the materials used in the manufacture of the polymer, for example, to the monomers before polymerization, whereupon the mixture is polymerized (examples: polystyrene, polyvinyltoluene). Further variants in the use of the scintillators mentioned result directly from the conventional operations in this technology.

The benzoxazole derivatives to be used in the present process may be obtained by known methods, for example and preferably by reacting—advantageously approximately equimolecular proportions—of an ortho-aminophenol of the formula (A) 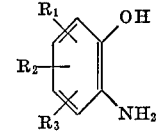

(where $R_1$ to $R_3$ have the meanings defined above) with 4'-diphenylcarboxylic acid or a functional derivative thereof (such as for example an ester or a halide); the reaction may be carried out in the melt of the reaction components or in a solvent inert towards the reactants. Suitable inert solvents are above all those which boil above about 140° C., for example halobenzenes such as dichlorobenzene and trichlorobenzene; polyhydric alcohols or their ethers such as ethyleneglycol-diethyleneglycol, triethyleneglycol, glycerol, diethyleneglycol-diethyl ether; high-boiling hydrocarbons such as para-cymene and others. The reaction temperature is in general in the range from 120 to 250° C., preferably from 160 to 200° C. The reaction is advantageously performed in the presence of a catalyst suitable for forming amide bonds such as boric acid, para-toluenesulphonic acid, zinc chloride or the like, the catalyst being used in an amount from 0.1 to 5, preferably from 0.5 to 1, percent by weight.

In the second reaction step the oxazole ring closure is carried out by heating the primarily formed amide (B) 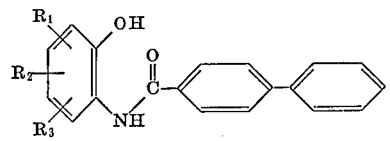

in the presence of a dehydrating agent, advantageously polyphosphoric or pyrophosphoric acid (used in excess over the stoichiometric proportion); the temperature ranges being the same as mentioned above.

Finally, it is also possible to use another method such as practised in similar cases, by replacing in the above-mentioned reaction the aminophenol by the corresponding nitrophenyl, and reacting said nitrophenol advantageously with the acid chloride of 4-diphenylcarboxylic acid, and thereafter reducing the nitro group, followed by cyclization.

Unless otherwise indicated, parts and percentages in the following Manufacturing Instructions and Examples are by weight.

MANUFACTURING INSTRUCTIONS

A mixture of 82.5 of para-tertiary butyl-orthoaminophenol, 99 parts of diphenyl-4-carboxylic acid, 2 parts of boric acid and 200 parts of diethyleneglycol diethyl ether is heated under nitrogen for 30 minutes at 170° C. While stirring the batch, the temperature is raised to 220° C. and the aqueous mixture of diethyleneglycol diethyl ether is distilled off in the course of 2 hours, finally under a water-jet vacuum to remove its last remnants. The melt is then dissolved in boiling dimethylformamide, freed from impurities by filtration, cooled with ice, and the product of the formula (4) 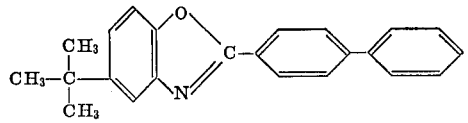

is obtained in the form of light brown crystals. Yield: about 140 parts.

A colourless analytically pure product obtained by three recrystallizations from hexane melts at 135 to 135.5° C. and reveals the following data:

Analysis.—$C_{23}H_{21}ON$ (percent): calculated: C, 84.37; H, 6.47; N, 4.28. Found (percent): C, 84.17; H, 6.64; N, 4.23%.

The following compounds may be prepared in a similar manner.

(5) 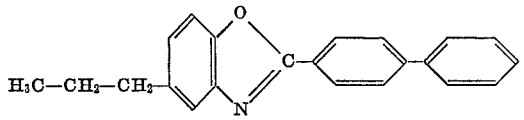

Colourless, shiny flakes and small needles from ethanol, melting at 99 to 99.5° C.

Analysis.—$C_{22}H_{19}ON$; (mol. weight 313.38). Calculated (percent): C, 84.31; H, 6.11; N, 4.47. Found (percent): C, 84.25; H, 6.09; N, 4.50.

(6) 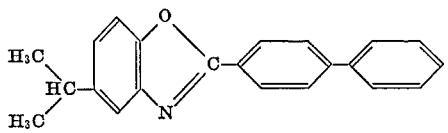

Colourless, fine needles from ethanol, melting at 118 to 118.5° C.

Analysis.—$C_{22}H_{19}ON$; (mol. weight 313.38). Calculated (percent): C, 84.31; H, 6.11; N, 4.47. Found (percent): C, 84.61; H, 6.05; N, 4.46.

(9) 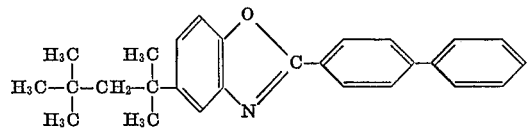

Colourless, shiny fine needles and tinsel from ethanol, melting at 133.5 to 134° C.

Analysis.—$C_{27}H_{29}ON$; (mol. weight 383.51). Calculated: C, 84.55; H, 7.62; N, 3.65. Found (percent): C, 84.66; H, 7.50; N, 3.68.

(10) 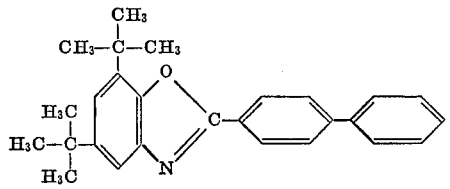

Colourless, fine needles from cyclohexane, melting at 163.5 to 164° C.

Analysis.—$C_{28}H_{31}ON$; (mol. weight 397.54). Calculated (percent): C, 84.59; H, 7.86; N, 3.52. Found (percent): C, 84.80; H, 7.71; N, 3.63.

(11) 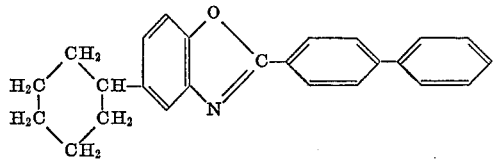

Colourless, finely crystalline powder from cyclohexane, melting at 170 to 171° C.

Analysis.—$C_{25}H_{23}ON$; (mol. weight 353.44). Calculated (percent): C, 84.96; H, 6.56; N, 3.96. Found (percent): C, 84.85; H, 6.51; N, 4.22.

Unless otherwise indicated, the measurements in the following examples were obtained in potassium-poor counter tubes with a liquid scintillator spectrometer "TRI-CARB" model Ex-2, makers Packard Inst. Comp. Inc., Ill.

EXAMPLE 1

20 ml. of a solution of 5 g. of the compound of the Formula 4 in 1 litre of toluene are poured into a counter tube and mixed with 1 ml. of a solution of benzoic acid, marked with $C^{14}$, having an activity of 0.01 microcurie. The counter tube is inserted in the counter and the counts per minute are recorded. At a high voltage of 900 volts and a calibration from 100 to 600 there are found 15,420 counts per minute.

EXAMPLE 2

20 ml. of a solution of 5 g. of the compound of the Formula 4 in 1 litre of toluene are poured into a counter tube, and then 0.1 ml. of toluene, marked with $H^3$, having an activity of 0.01 microcurie is added. At a high voltage of 1100 volts and a calibration from 100 to 600 there are found 7400 counts per minute.

EXAMPLE 3

20 ml. of a solution of 6 g. of the compound of the Formula 4 in 1 litre of toluene are mixed in a counter tube with 1.0 ml. of an ethanolic solution of $S^{35}$-marked 1-butyl-3-(para-tolylsulphonyl)-urea. The added activity amounted to 0.01 microcurie. The counter tube is then inserted in the counter and the counts per minute recorded. At a high voltage of 900 volts and a calibration from 100 to 600 in the measuring channel 15,490 counts per minute are found.

EXAMPLE 4

20 ml. of a solution of 10 g. of the compound of the Formula 4 in a mixture of 400 g. of methylcellosolve, 80 g. of naphthalene and 600 ml. of toluene are poured into a counter tube, and then 0.5 ml. of $H^3$-marked water of an activity of 0.01 microcurie is added. At a high voltage of 1200 volts and a calibration from 100 to 600, 2630 counts per minute are recorded.

EXAMPLE 5

0.01 microcurie of $C^{14}$-marked dinitrobenzene was burnt in an oxygen flask by the Schöniger method and the combustion products as well as the $C^{14}$-$CO_2$ formed were absorbed in 15 ml. of a mixture of methanol and ethanolamine (400:60). 10 ml. of this solution were poured into a plastics counter tube, and 10 ml. of a solution of 10 g. of the compound of the Formula 4 in 1 litre of toluene were added. At a high voltage of 1050 volts and a calibration from 100 to 600 in the measuring channel 6600 counts per minute were recorded.

EXAMPLE 6

0.01 microcurie of $H^3$-marked pyrocatechol was burnt in an oxygen flask by the Schöniger method and the combustion products as well as the $H^3$-water present therein were absorbed in 10 ml. of methanol. 5 ml. of this absorption solution were poured into a plastics counter tube and 15 ml. of a solution of 8 g. of the compound of the Formula 4 in 1 litre of toluene were added. At a high voltage of 1150 volts and a measuring calibration from 100 to 600, 1900 counts per minute were recorded.

What is claimed is:
1. A new benzoxazole derivative of the formula

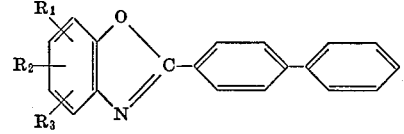

in which $R_1$ represents a member selected from the group consisting of an alkyl group with 3 to 8 carbon atoms and a cyclohexyl group, $R_2$ a hydrogen atom or an alkyl group with 3 to 8 carbon atoms, and $R_3$ represents a hydrogen atom or an alkyl group with 1 to 4 carbon atoms.

2. A new benzoxazole derivative of the formula

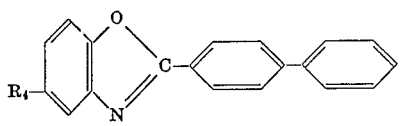

in which R₄ represents an alkyl group with 3 to 8 carbon atoms.

3. A new benzoxazole derivative of the formula

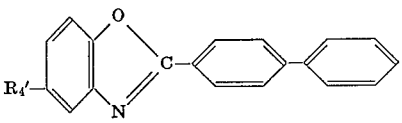

in which R₄' represents a branched-chain alkyl group with 3 to 8 carbon atoms.

4. The compound of the formula

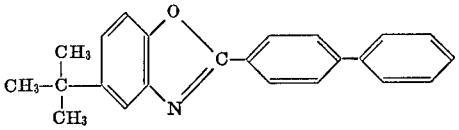

References Cited
UNITED STATES PATENTS
2,985,661   5/1961   Hein et al. _____ 260—307
3,336,330   8/1967   Schinzel et al. _____ 260—307

OTHER REFERENCES
Pushkina et al.: Chem. Abstracts, vol. 59, p. 128 (1963).

ALTON D. ROLLINS, Primary Examiner

U.S. Cl. X.R.

252—301.2; 260—558, 575